3,030,216
REFRACTORY COMPOSITION

Lewis W. Chantler and William O. Hund, Charles Town, W. Va., assignors, by mesne assignments, to Martin-Marietta Corporation, Chicago, Ill., a corporation of Maryland
No Drawing. Filed Nov. 4, 1958, Ser. No. 771,750
17 Claims. (Cl. 106—58)

This invention relates to refractory composition. More particularly, it relates to magnesia, magnesia-chrome and chrome-magnesia refractories and to the bonding of the materials in a refractory body. Still more particularly, it relates to refractory composition for use in constructing and patching of industrial furnace parts such as for example, open hearth furnace bottoms, converter linings, and the like.

With the development of newer metallurgical processes and the demand for better refractories for existing processes there is a need for refractory materials and ramming mixes which are capable of withstanding the more severe operating conditions. For satisfactory service, it is desirable that the combination of refractory material and bonding material develop adequate refractory characteristics, possess resistance to chemical action under heat and resistance to thermal shock so as to approach the characteristics of the magnesia, magnesia-chrome or chrome-magnesia refractory which it binds into a solid structure.

Magnesia compositions have been produced by chemically bonding the refractory. These chemically bonded refractories or ramming mixes, generally have consisted of sized magnesia or magnesium material with a water soluble or water plasticized material as binder. For example, sodium silicate imparts to ramming mixes too great shrinkage and the mixes fail after firing to present a continuous impermeable base. Sodium silicate promotes hydration of the magnesia causing expansion. Density of mixes containing sodium silicate have been acceptable in the absence of higher density products of equivalent good properties of hydration, etc. Others of the known chemically bonded refractories undergo considerable change in volume, usually shrinkage during firing which shrinkage gives rise to cracks permitting molten metal to penetrate or "strike through" the lining, so weakening the refractory that the load bearing characteristics thereof are materially diminished. Shrinkage cracks may also occur during firing due to the swelling of the magnesia composition through hydration during the mixing and subsequent stages of handling prior to firing.

To be useful, ramming mixes must meet certain minimum requirements for, among other properties, strength, density, shrinkage and hydration. Sodium silicate has been one of the chemicals used in ramming mixes as a bonding agent for magnesium compounds. Sodium silicate imparts excellent strength to such compositions. It has the disadvantages of promoting hydration, adding an undesirable component, silicon dioxide and increasing shrinkage upon burning. Other chemicals such as chromium-bearing compounds have been added to refractories to increase the strength thereof. Chrome may be used in these compositions in quantities introducing up to about 3% of the mix calculated on a $Cr_2O_3$ basis.

Boron compounds have also been incorporated in the ramming mixes to minimize swelling due to hydration and cracking during firing. These mixes may comprise from 0.25% to 5% of the boron ocmpound calculated as $B_2O_3$.

Organic acids have also been used in magnesia or magnesia-oxy cements. These acids were introduced into magnesia cement compositions containing reactive magnesia, with or without added salt such as magnesium sulphate, lime, and the like. Any organic acids, liquid or solid, such as acetic acid, citric acid, etc., are useful reactants in these compositions containing reactable magnesium components. Stewart, for example, in United States Patent No. 1,853,521 teaches a magnesia cement composition comprising magnesia, reactive magnesium salt and organic acid such as acetic acid, citric acid, tartaric acid and salts of such acids. These acids and salts form binders by reaction with reactive magnesia or reactive magnesium salts. This type of magnesia cement composition will crack during firing and will not meet requirements for refractories in modern metallurgical processes.

Broadly stated, the present invention contemplates a mixture of several ingredients wherein unusual properties for the desired purpose are attributable to the mixed or combined relationship of the ingredients and to the method of producing a refractory from said mixture or ingredients. The improved refractory material comprises dead-burned magnesite and a binder component selected from the group consisting of alkali metal salts of tartaric acid and mixtures thereof. In adapting the refractory material to specific use, the refractory may contain a chromium bearing material either of the chrome ore refractory type or chromium binder materials and also small amounts of sodium silicate, for example, 1 to 5% by weight.

Chromium binder materials are to be distinguished from chrome ores which are mixtures of chromium, aluminum, iron, and the like, complexes of oxides, silicates, etc. As binder, chromium compounds are used in quantities generally less than 3% by weight of the mix on a $Cr_2O_3$ basis. Chrome ore on the other hand may constitute up to 50% or even more of the refractory mix.

The magnesite which is employed can be any high purity dead-burned magnesia obtained by calcining high grade natural ores such as magnesite or brucite, or it can be obtained by calcining any magnesium compound which yields magnesium oxide upon calcination. The magnesia can be obtained, for instance, by recovering magnesium chloride from potash solutions and heating the magnesium chloride under conditions to evolve hydrochloric acid and produce magnesium oxide. This MgO product, with or without compounding with materials such as talc is calcined to produce dead-burned magnesia of 93% or higher purity. The magnesia also can be produced by calcining relatively pure magnesium hydroxide or magnesium carbonate at temperatures usually ranging from 2700–3500° F.

The magnesite is employed in the dead-burned state. Chemical analysis of typical magnesias show various components in the following ranges.

| Material: | Ranges, percent |
|---|---|
| $SiO_2$ | 2.5–8 |
| $Fe_2O_3$ | 1.0–6 |
| $Al_2O_3$ | 0.5–3 |
| CaO | 1.5–6 |
| MgO | 80–95 |

When making up batches of ramming mixes, the grain or particle size of the aggregates can, if desired, be selected primarily because of area, method of emplacement and packing characteristics. Representation screen sizing of the particles may be as follows, the sizes being U.S. standard screen sizes.

| Screen sizings | (1) | (2) | (3) | (4) |
|---|---|---|---|---|
| Percent pass ¼" | 100 | 100 | | |
| #4 | 94 | 97 | | |
| #8 | 64 | 76 | 99 | 100 |
| #16 | 51 | 56 | 81 | 90 |
| #30 | 49 | 41 | 56 | 65 |
| #100 | 36 | 23 | 32 | 27 |

Such products may be made by screening out various groups of particles sizes and then recombining them to obtain the desired particle size curve. As many as four or five different sized products may be recombined to form a ramming mix. It is usually preferable to maintain a content of 20% to 40% of material passing a 100 mesh screen. These sizings, shown as applicable to magnesia, may also be applied to chrome ore if that is a desired component of the ramming mix.

A typical chrome ore useful for the purposes of this invention shows the following chemical analysis.

|  | Percent |
|---|---|
| $SiO_2$ | 4.8 |
| FeO | 24.3 |
| $Al_2O_3$ | 16.9 |
| CaO | Traces |
| MgO | 11.0 |
| $Cr_2O_3$ | 42.7 |

When preparing ramming mixes containing chrome ore, the basic constitutents i.e., the mixture of magnesia and chrome ore generally have a chemical analysis falling in the following ranges.

|  | Percent |
|---|---|
| $SiO_2$ | 3.0–8 |
| $Fe_2O_3$ | 3.0–15 |
| $Al_2O_3$ | 2.5–10 |
| CaO | 1.5–5 |
| MgO | 40–80 |
| $Cr_2O_3$ | 0–30 |

To the basic ramming mix constituents is added a salt of tartaric acid. The salt is admixed with the refractory composition components in quantities varying 0.25% to 2.5% by weight. Useful salts of tartaric acid are the alkali metal salts such as sodium tartrate, potassium tartrate, and lithium tartrate or mixed salts thereof such as sodium potassium tartrate and mixtures thereof.

Chrome ore is useful in this invention in quantities up to 70% of the dry mix. Chromium compounds useful as binders are, of example, chromic acid, chromium-containing slats, chromus sulphate, chromic sulphate, chromic halides, chromic-oxalate, chromates and dichromates. Chromium salts, acting as binders, calculated as $Cr_2O_3$, may constitute up to 3% by weight of the dry mix.

In preparing the ramming mix compositions according to the present invention, the components can be mixed together and water added for immediate use or the dry mixture can be stored or shipped. It is preferred to grind each component separately and mix the ground materials. If desired, when the ramming mixes are to contain chromium, the magnesia component and the chromium component can be ground together.

When the dry ramming mix has been thoroughly mixed with 3–6 lbs. of water per 100 lbs. of dry ramming mix composition to form a wetted mixture, the material can be formed by ramming in any manner known to the art.

When making up the batches, the particle size of the components can, if desired, be selected in order to provide dense packing in the known manner.

When utilizing a ramming mix for the preparation of furnace linings, a representative ramming mix, prepared from comminuted periclase, showed a particle size 39% of which passed through a 100 mesh U.S. standard screen. This dead-burned magnesite possessed a particle size as follows:

96% passing a No. 4 U.S. standard screen;
64% passing a No. 8 U.S. standard screen;
49% passing a No. 30 U.S. standard screen.

This magnesite material showed a chemical analysis of:

|  | Percent |
|---|---|
| $SiO_2$ | 4.8 |
| $Fe_2O_3$ | 2.4 |
| $Al_2O_3$ | 1.3 |
| CaO | 4.0 |
| MgO | 87.5 |

In order to obtain the proper forming characteristics, solids are wetted with varying amounts of water depending upon the mode of application and upon the area of application. In general, mixes may carry between about 3 and about 10% of water. Ramming mixes usually are limited to between about 3% and about 6% but under special conditions amounts outside of this range may be utilized. For gunning of this type of refractory mixture, higher water content is initially introduced in order to be certain that the deposited mixture has suitable characteristics at the time of deposition by which time some of the initially incorporated water has been evaporated.

When the above specified mixture is mixed with 4 parts of water per 100 parts by weight of dry ramming mix composition, this ramming mix will be transferred into place for firing and the mix will hold its shape and can be fired by bringing up to a temperature of approximately 2800–2900° F. over a period of about 72 hours.

For comparative tests, results of which are summarized in Table I, refractory materials were prepared as follows:

To form a batch A, there was admixed a magnesia mix of the following composition by size:

100% passing ¼ inch screen
94% passing #4 screen
64% passing #8 screen
51% passing #16 screen
34% passing #100 screen and 2% of sodium tartrate. The ingredients were thoroughly blended dry in a revolving-blade type mixer and approximately 4% of water added to produce a uniformly wetted composition. This composition was rammed into Dietert cylinders of 2 inch diameter utilizing a 14 lb. weight. After the mold was removed, the cylinders were dried for 16 to 24 hours at 220° F. The second set of cylinders were dried for 16 to 24 hours at 220° F. and then fired at 2910° F. for two hours.

Weight and dimension of dried cylinders were obtained before and after burning, so as to determine shrinkage. Hydration was determined on rammed and dried cylinders by autoclaving the dried cylinders at 80 p.s.i.g. for 3 hours. The resulting material was dried by heating to 220° F. while circulating dry air and screened on a No. 30 U.S. standard screen.

Crushing strength of dried but unfired cylinders was obtained by crushing in a hydraulic press.

The following tables show a comparison of ramming mixes prepared from identical magnesia base and varying only in the type of binder used.

TABLE I

| Admixture | Percent | Percent ramming water | Dry, lb./cu. ft. | crushing strength, p.s.i. | 2910° F. 2 hrs. | | |
|---|---|---|---|---|---|---|---|
| | | | | | Percent wt. loss | Percent vol. shrink. | Percent height shrink. |
| Sodium Tartrate | 2 | 4 | 162 | 5,080 | 2.6 | 8.1 | 2.5 |
| Sodium Potassium Tartrate | 2 | 4 | 166 | 5,140 | 2.4 | 8.2 | 2.6 |
| Sodium Acid Tartrate | 2 | 4 | 163 | 4,000 | 2.8 | 8.4 | 2.4 |

Upon hydration of mixes, results were as follows:

TABLE II

| Admixture | Percent | Dry Cylinder Weight | Grams on No. 30 screen | Appearance |
|---|---|---|---|---|
| Sodium Tartrate | 2 | 91.7 | 90.6 | good. |
| Sodium Potassium Tartrate | 2 | 92.9 | 92.1 | fair-good. |
| Sodium Acid Tartrate | 2 | 89.8 | 91.9 | good. |
| Sodium Silicate | 4 | 84.9 | 64.2 | poor. |

Dietert cylinders of the above admixtures utilizing alkali metal salts of tartaric acid as binders, when dried, show increase density as compared to magnesia ramming mixes containing sodium silicate. These cylinders, fired at 2910° F. for two hours, also show considerably lower shrinkage than like cylinders using sodium silicate as a binder. These mixes show negligible hydration whereas the cylinders utilizing sodium silicate as a binder show appreciable hydration. To illustrate the superiority of the magnesia ramming mixes prepared with salts of tartaric acid comparison is set forth showing improved density, improved crushing strength and lower shrinkage as compared to sodium silicate, the most commonly used binder agent.

TABLE III

| Binder | percent | oven dried density | oven dried crushing strength, p.s.i. | percent burnt volume shrinkage |
|---|---|---|---|---|
| Sodium Silicate | 4 | 157 | 4,800 | 12.3 |
| Sodium Tartrate | 2 | 163 | 5,080 | 8.1 |
| Sodium Potassium Tartrate | 2 | 166 | 5,140 | 8.2 |
| Sodium Acid Tartrate | 2 | 164 | 4,000 | 8.4 |

Example I

A refractory suitable for casting or ramming into a bottom for an open hearth furnace was made as follows:

A dead-burned magnesite showing the following chemical analysis:

| | |
|---|---|
| $SiO_2$ | 4.8 |
| $Fe_2O_3$ | 2.4 |
| $Al_2O_3$ | 1.3 |
| CaO | 4.0 |
| MgO | 87.4 |
| Ignition loss | 0.1 | was crushed and a mixture of particles prepared which showed 69% passing a #8 U.S. standard screen and retained on a #30 U.S. Standard screen and 30% passing the #100 U.S. standard screen. To each 99 parts of this magnesia material was added 1 part by weight of powdered sodium tartrate and the composition rendered uniform by tumbling in a revolving drum mixer. At the time of use, the composition is wetted by adding 4% by weight of water. The wetted material was rammed into position where it set to a dense compacted mass. After firing for about 48 hours to a temperature of about 2910° F., the mass set to a hard refractory mass.

Example II

A refractory suitable for patching a furnace lining was prepared from the magnesite whose chemical analysis is given in Example I. 45 parts by weight of particles of this magnesite of a size passing a ¼ inch U.S. standard screen and retained on a #8 U.S. standard screen, 26 parts of magnesite of a size passing a #8 U.S. standard screen and retained on a #100 U.S. standard screen and 27 parts of magnesite of a size passing a #100 U.S. standard screen were mixed with two parts by weight of powdered sodium potassium tartrate and the composition rendered uniform by tumbling in a revolving drum mixer. At the time of use, the composition is wetted by adding 4% by weight of water.

Wetted material was formed into shaped masses where it set to a dense compacted mass. After firing for about 72 hours at a temperature of about 2910° F., the shaped masses set to a hard refractory mass.

Example III

A refractory suitable for patching a furnace lining was prepared from the magnesite whose chemical analysis is given in Example I.

50 parts by weight of particles of magnesite of a size passing a ¼ inch U.S. standard screen and retained on a a #8 U.S. standard screen was mixed with 49 parts by weight of chrome ore, of the analysis shown hereinbefore when discussing chrome ore, having a particle size such that 100% passed a #30 U.S. standard screen.

To 99 parts by weight of the dry mixture was added 1 part by weight of powdered sodium acid tartrate.

The mixture was agitated and the composition rendered uniform by tumbling in a revolving drum mixer. At the time of use, the composition is wetted by adding 4% by weight of water. The mixture was rammed into shape. After firing for about 48 hours at a temperature of about 2910° F., the rammed material set to a hard mass exhibiting substantially no shrinkage or cracking.

Example IV

A refractory suitable for patching a furnace lining was prepared from the magnesite whose chemical analysis is given in Example I.

50 parts by weight of particles of magnesite of a size passing a ¼ inch U.S. standard screen and retained on a #8 U.S. standard screen and 47 parts by weight of magnesite of a particle size passing a #30 U.S. standard screen were agitated to obtain a uniform mixture.

To each 97 parts by weight of this mixture of magnesia particles was added 2 parts of sodium silicate powder of a particle size 100% passing a #30 screen and 85% passing a #100 U.S. standard screen and 1 part by weight of powdered sodium tartrate. This composition was agitated and the composition rendered uniform by tumbling in a revolving drum mixer. At the time of use, the composition is wetted by adding 4% by weight of water.

The mixture was rammed into shape. After firing for about 72 hours at a temperature of about 2910° F., the rammed material set to a hard mass exhibiting substantially no shrinkage or cracking.

We claim:

1. A refractory ramming mixture consisting essentially of dead-burned magnesite and between about 0.25% and about 2.5% of salt component selected from the group consisting of alkali metal salts of tartaric acid and mixtures thereof.

2. A refractory ramming mixture consisting essentially of dead-burned high purity magnesite and between about 0.25% and about 2.5% of salt component selected from the group consisting of alkali metal tartrate and mixtures thereof.

3. The refractory ramming mixture of claim 2 wherein the salt is sodium tartrate.

4. The refractory ramming mixture of claim 2 wherein the salt is sodium potassium tartrate.

5. The method of preparing refractory compositions which comprises admixing dead-burned magnesite, between about 0.25% and about 2.5% of a metal salt binder selected from the group consisting of alkali metal salts of tartaric acid and mixtures thereof, adding water to said mixture to produce a mixture of wetted particles, ramming the wetted mixture of particles into position, hardening the wetted mixture and firing the same.

6. A method of making a refractory furnace lining using ramming mix which comprises admixing dead-burned magnesite, up to about 70% by weight of the dry mixture of chrome ore, between about 0.25% and about 2.5% of salt component selected from the group consisting of alkali metal salts of tartaric acid and mixtures thereof, adding water to said admixture to produce a mixture of wetted particles, ramming the wetted mixture into position, hardening the wetted mixture by drying and firing.

7. A method of making a refractory furnace lining using ramming mix which comprises admixing dead-burned magnesite, up to 3% by weight of chromium salt calculated as $Cr_2O_3$, between about 0.25% and about 2.5% of salt component selected from the group consisting of alkali metal salts of tartaric acid and mixtures thereof, adding water to said admixture, to produce a mixture of wetted particles, ramming the wetted mixture into position, hardening the wetted mixture by drying and firing.

8. A method for making a refractory furnace lining using ramming mix which comprises admixing dead-burned magnesite, between about 1% and about 5% by weight of sodium silicate and between about 0.25% and about 2.5% of salt component selected from the group consisting of alkali metal salts of tartaric acid and mixtures thereof, adding water to said admixture to produce a mixture of wetted particles, ramming the wetted mixture into position, hardening the wetted mixture by drying and firing.

9. The method of preparing refractory compositions which comprises admixing dead-burned magnesite, and between about 0.25% and aobut 2.5% of a metal salt binder selected from the group consisting of alkali metal salts of tartaric acid and mixtures thereof, adding between about 3% and about 10% of water on a weight of the mixture basis to produce a mixture of wetted particles, depositing mixture of particles in a desired position and hardening the wetted mixture and firing the same.

10. The method of preparing refractory compositions which comprises admixing dead-burned magnesite, and between about 0.25% and about 2.5% of a metal salt binder selected from the group consisting of alkali metal salts of tartaric acid and mixtures thereof, adding between about 3% and about 6% of water on a weight of the mixture basis to produce a mixture of wetted particles, ramming mixture of particles in a desired position and hardening the wetted mixture and firing the same.

11. A refractory ramming mixture consisting essentially of dead-burned magnesite, up to about 70% by weight of the dry mixture of chrome ore and between about 0.25% and about 2.5% by weight of salt component selected from the group consisting of alkali metal salts of tartaric acid and mixtures thereof.

12. A refractory ramming mixture consisting essentially of dead-burned magnesite, up to 3% by weight of chromium salt, calculated as $Cr_2O_3$ and between about 0.25% and about 2.5% by weight of salt component selected from the group consisting of alkali metal salts of tartaric acid and mixtures thereof.

13. A refractory ramming mix consisting essentially of dead-burned magnesite of a particle size such that 100% will pass through a ¼ inch U.S. standard screen and about 23% will pass through a #100 U.S. standard screen, and between about 0.25% and about 2.5% of salt component selected from the group consisting of alkali metal salts of tartaric acid and mixtures thereof.

14. A refractory ramming mix consisting essentially of comminuted dead-burned periclase of a particle size such that about 97% passes a #4 U.S. standard screen and about 41% passes a #30 U.S. standard screen and between about 0.25% and about 2.5% of salt component selected from the group consisting of alkali metal salts of tartaric acid and mixtures thereof.

15. A refractory ramming mix consisting essentially of admixing dead-burned magnesite of a particle size such that 69 parts by weight pass a #8 U.S. standard screen and is retained on a #30 U.S. standard screen and about 30 parts by weight pass the #100 U.S. standard screen, one part by weight of powdered sodium tartrate per each 99 parts of magnesium material and 4 parts of water per 100 parts of solids.

16. A refractory ramming mix consisting essentially of dead-burned magnesia, said magnesia being of a particle size such that 45 parts by weight pass a ¼ inch U.S. standard screen and are retained on a #8 U.S. standard screen, 26 parts by weight pass a #8 U.S. standard screen and are retained on a #30 U.S. standard screen and 27 parts by weight pass a #100 U.S. standard screen, two parts by weight of sodium potassium tartrate, four parts by weight of water per 100 parts by weight of dry solids.

17. A refractory ramming mix consisting essentially of 50 parts by weight of dead-burned magnesite of a size passing a ¼ inch U.S. standard screen and retained on a #8 U.S. standard screen, 49 parts by weight of chrome ore of a particle size 100% of which passes a #30 U.S. standard screen, one part by weight of powdered sodium acid tartrate and four parts by weight of water per 100 parts by weight of solids.

References Cited in the file of this patent

UNITED STATES PATENTS

| | | |
|---|---|---|
| 2,501,336 | Hyde et al. | Mar. 21, 1950 |
| 2,855,318 | Kerla | Oct. 7, 1958 |